United States Patent [19]
Popp

[11] Patent Number: 5,693,204
[45] Date of Patent: Dec. 2, 1997

[54] PASSIVE PH ADJUSTMENT FOR ANALYTICAL INSTRUMENTS

[75] Inventor: William J. Popp, Cedarburg, Wis.

[73] Assignee: Great Lakes Instruments Inc., Milwaukee, Wis.

[21] Appl. No.: 572,200

[22] Filed: Dec. 13, 1995

[51] Int. Cl.⁶ ............................................ G01N 27/26
[52] U.S. Cl. ................ 204/409; 204/433; 204/435; 204/249; 204/264; 204/276; 210/198.1; 210/199; 210/924; 210/925; 205/787.5
[58] Field of Search ................... 204/409, 433, 204/435, 249, 264, 276; 210/198.1, 199, 924, 925

[56] References Cited

U.S. PATENT DOCUMENTS

| | | |
|---|---|---|
| 4,477,363 | 10/1984 | Wong et al. ........................ 252/134 |
| 4,911,858 | 3/1990 | Bunczk et al. ..................... 252/106 |
| 4,911,859 | 3/1990 | Bunczk et al. ..................... 252/106 |
| 4,940,134 | 7/1990 | Aoki et al. ......................... 210/774 |
| 5,043,090 | 8/1991 | Camp et al. ....................... 252/106 |
| 5,188,755 | 2/1993 | Chang ................................ 252/174 |
| 5,306,623 | 4/1994 | Kiser et al. ........................ 422/101 |
| 5,342,510 | 8/1994 | Eden et al. ........................ 204/433 |
| 5,350,512 | 9/1994 | Tang ................................... 210/199 |

Primary Examiner—Bruce F. Bell
Attorney, Agent, or Firm—Quarles & Brady

[57] ABSTRACT

An apparatus for adjusting the pH of an electrolytically dissociated process stream is disclosed. The apparatus includes a matrix of pH adjusting chemical and an erosion rate modifier. The pH adjusting chemical is preferably citric acid and the erosion rate modifier is preferably polyethylene glycol. A porous material such as a sponge may be interposed between the matrix and the process stream to further modify the erosion rate.

23 Claims, 2 Drawing Sheets

5,693,204

PASSIVE PH ADJUSTMENT FOR ANALYTICAL INSTRUMENTS

FIELD OF THE INVENTION

This invention relates to a method and apparatus that is primarily useful in analytical measurements. More particularly, it relates to the use in an analytical apparatus and method for quantifying the amount of free chlorine in a process by determining the amount of hypochlorous acid and hypochlorite ion that is in solution.

BACKGROUND OF THE INVENTION

Instruments for and methods of measuring the amount of a chemical compound or specie in an electrolytically dissociated solution often depend on quantifying the amount of a first compound or specie and, by simultaneously measuring the solution pH, calculating the relative amount of a second compound or specie which is in equilibrium with the first compound or specie. However, if the pH is in an unacceptable range, it will be difficult to accurately quantify the first compound or specie because of an unfavorable equilibrium in favor of the second compound or specie.

For example, the amount of free residual chlorine in a process is determined by quantifying the amount of hypochlorous acid (HOCl) and hypochlorite ion (OCl$^-$) that is in solution. Hypochlorous acid, being a weak acid, dissociates relative to solution pH to establish an equilibrium with hypochlorite ion:

$$HOCl = H^+ + OCl^- \quad pK_a = 7.5$$

At pH 7.5, the concentration of HOCl and OCl$^-$ are equal. However, as pH increases above 7.5, the concentration of HOCl decreases. If the solution pH exceeds 8.5, the HOCl is nearly completely dissociated to OCl$^-$, leaving insufficient HOCl to be measured. At this point, a pH adjusting solution must be added to lower the pH, thereby increasing the concentration of HOCl. Present technology employs the addition of a pH adjusting solution by pumping a liquid acid (typically an acetic acid solution) into a reaction vessel. This method requires a series of separate storage vessels, metering pumps and motors.

Unfortunately, the art has not yet developed a passive pH adjusting system which would not require pumps or motors. Thus, a need exists for an improved apparatus and method of delivering a pH adjusting chemical which is simple, inexpensive, and relatively maintenance free.

SUMMARY OF THE INVENTION

One aspect of the present invention provides an apparatus for adjusting the pH of an electrolytically dissociated process stream comprising: a housing having an inlet and an outlet for the process stream; and a surface erodible matrix disposed in the housing such that the matrix forms a plenum between itself and the housing, wherein the plenum allows for flow of the process stream between the inlet and the outlet of the housing, and wherein the matrix comprises a pH adjusting chemical and an erosion rate modifier. Preferably, the pH adjusting chemical is citric acid and the erosion rate modifier is polyethylene glycol. Most preferably, the polyethylene glycol has a molecular weight of about 8,000. It is preferred that a porous material be disposed between the matrix and the process stream, wherein the porous material is capable of further modifying the erosion rate of the pH adjusting chemical. Preferably, the porous material is a sponge.

A further aspect of the present invention provides an analyzer having a sensor capable of measuring a chemical specie in the electrolytically dissociated process stream, wherein the sensor can be in fluid communication with the pH adjusted process stream.

Another aspect of the present invention provides an apparatus for adjusting the pH of an electrolytically dissociated process stream comprising: a housing having an inlet and an outlet for the process stream; a container having an opening, the container being disposed in the housing such that the container forms a plenum between itself and the housing, wherein the plenum allows for flow of the process stream between the inlet and the outlet of the housing and wherein the opening of the container is in communication with the plenum; a surface erodible matrix disposed in the container, wherein the matrix comprises a pH adjusting chemical and an erosion rate modifier. Preferably, a porous material is disposed in the plenum and compressibly engaged with the opening of the container, wherein the porous material is capable of further modifying the erosion rate of the pH adjusting chemical. The pH adjusting chemical is preferably citric acid and the erosion rate modifier is preferably polyethylene glycol. Preferably, the polyethylene glycol has a molecular weight of about 8,000. Preferably, the porous material is a sponge.

A further aspect of the present invention provides an analyzer having a sensor capable of measuring a chemical specie in the electrolytically dissociated process stream, wherein the sensor can be in fluid communication with the process stream leaving the outlet of the housing. Alternatively, at least the sensor is in the plenum of the housing such that the sensor is in fluid communication with the pH adjusted process stream. The entire analyzer can also be integrated into the pH adjustment housing system.

A still further aspect of the present invention provides a method of adjusting the pH of an electrolytically dissociated process stream comprising feeding the process stream to the pH adjusting apparatus disclosed above.

Another aspect of the present invention provides a method of measuring the amount of free residual chlorine in a process, comprising: feeding a sample of the process to the pH adjusting apparatus disclosed above; determining the amount of hypochlorous acid in and the pH of the sample; calculating the amount of hypochlorite ion; and adding the determined amount of hypochlorous acid to the calculated amount of hypochlorite ion.

It will be appreciated that a very simple and inexpensive apparatus has been discovered which can be used to passively adjust pH for analytical measurements. It has also been discovered that such a pH adjustment apparatus can include a relatively simple flow-through housing which supports a container having a matrix of the pH adjusting chemical therein.

The objects of the present invention, therefore, include providing an apparatus of the above kind and a method of using the apparatus that: (a) has no moving parts such as pumps and motors; (b) avoids the use of liquid pH adjusting chemicals and storage systems; (c) is relatively inexpensive and simple to maintain; and (d) can be easily replenished with pH adjusting chemical.

These and still objects and advantages of the present invention will be apparent from the description below.

DETAILED DESCRIPTION OF THE INVENTION

The amount of free residual chlorine in a process is determined by quantifying the amount of hypochlorous acid [HOCl] and hypochlorite ion [OCl⁻] that is in solution. Hypochlorous acid, being a weak acid, dissociates relative to solution pH to establish an equilibrium with hypochlorite ion:

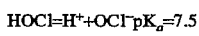

$HOCl \rightleftharpoons H^+ + OCl^- \quad pK_a = 7.5$

At pH 7.5, the concentration of HOCl and OCl⁻ are equal. However, as pH increases above 7.5, the concentration of HOCl decreases (see FIG. 5).

Many analytical instruments use a membrane covered amperometric cell which directly measures HOCl concentration. By simultaneously measuring solution pH, the analyzer calculates the relative amount of OCl⁻, adds this to the HOCl concentration, and displays the two as free residual chlorine concentration.

Figure 5:
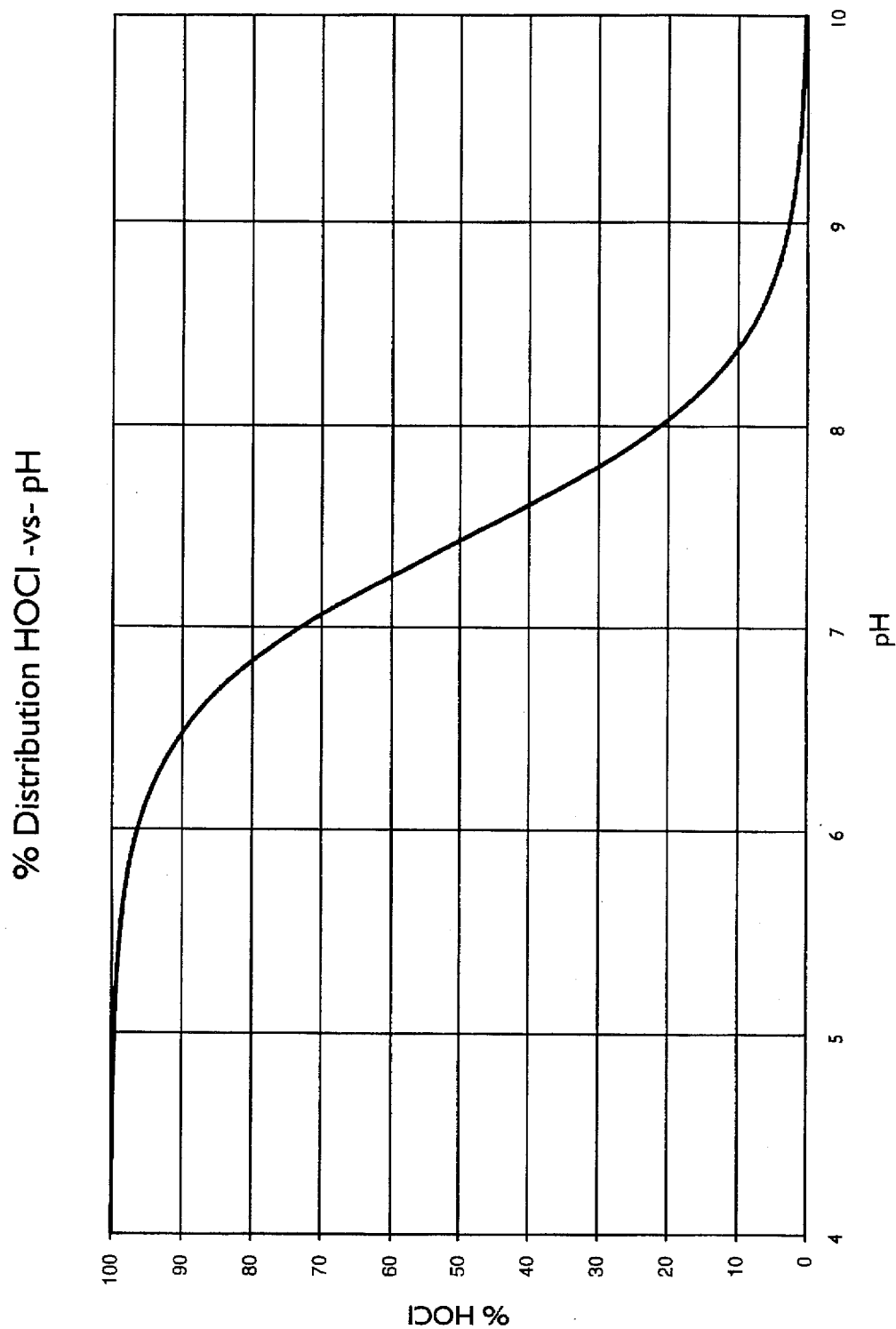
FIG. 5 is a graph of the percent distribution HOCl versus pH.

These analytical instruments will not operate effectively if the solution pH exceeds 8.5, due to the nearly complete dissociation of HOCl to OCl⁻ (see FIG. 5). At this point, a pH adjusting solution must be added to lower the pH, thereby increasing the concentration of HOCl. Current technology employs the addition of a pH adjusting solution by pumping a liquid acid into the reaction vessel. The present invention discloses a surprisingly simple, efficient and passive pH adjusting system which avoids the use of liquid delivery systems.

The current invention comprises, in part, citric acid embedded in a matrix of polyethylene glycol. This material is contained in, for example, a plastic bottle, and a layer of sponge material is placed over the mouth of the bottle. This combination is then placed into a flow-through housing, similar to that used in water filtration, where the buffer is slowly eroded and solution pH is lowered into the useful range of the analyzer.

The commercial grade citric acid is a weak, triprotic acid with acid dissociation constants ($pK_a$) of 3.220, 4.837, and 6.393. This provides three moles of hydrogen ion for every mole of citric acid dissolved in solution. The low $pK_a$'s ensure that all three hydrogen ions are used, which allows for an efficient use of reagent.

The polyethylene glycol (PEG) of average molecular weight of 8,000 is used as an erosion rate modifier to maintain a low, constant addition of citric acid to the process solution. The PEG is soluble in water, so an additional erosion rate modifier is used. This erosion rate modifier is a porous substrate which may be, for example, a sponge. This further controls the amount of citric acid that is added to the process solution.

Figure 1:
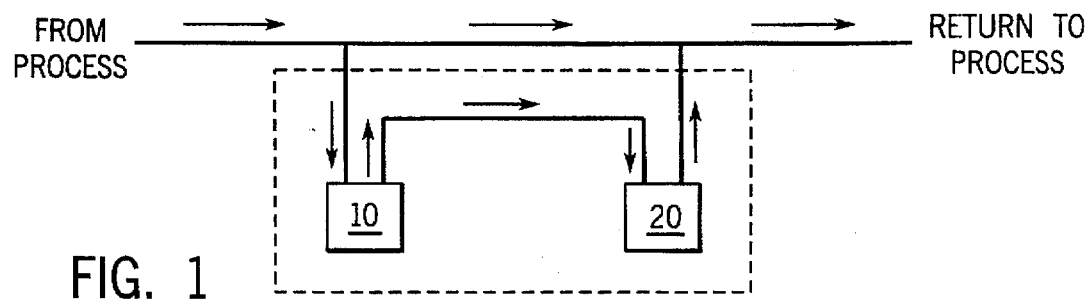
FIG. 1 is a schematic diagram showing the pH adjusting apparatus and analyzer of the present invention.

FIG. 1 is a schematic diagram of a typical installation of the pH adjusting apparatus and analyzer of the present invention. The pH adjusting apparatus 10 receives a sample stream from the process of interest. With the pH having been adjusted, the sample stream then enters analyzer 20 where, for example, the free residual chlorine can be determined. After the sample stream is analyzed, it returns to the process or is drained to waste. Note that the pH adjusting apparatus 10 and the analyzer 20 (or its sensor) may be integrated into a single housing as represented by the dashed line in FIG. 1. Such a single housing has the advantage of incorporating pH adjustment and an analyzer into a more compact and convenient unit.

Figure 2:
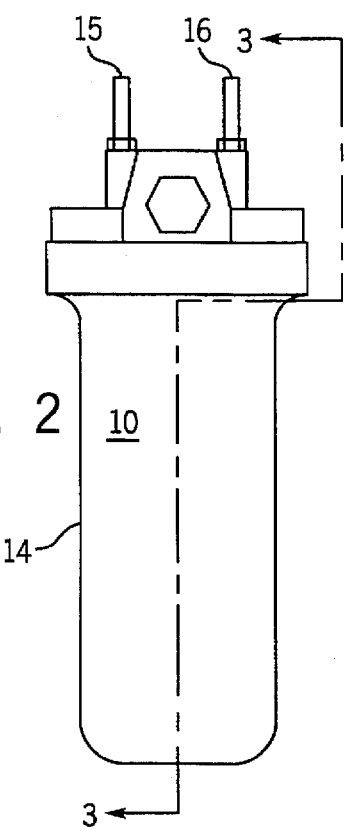
FIG. 2 is an elevational view of one example of a pH adjusting apparatus of the present invention.

FIG. 2 shows an outside elevational view of one example of the pH adjusting system 10 of the present invention. Typically, the housing 14 is a flow through housing similar to that used in water filtration. The housing may be made of any material which is compatible with the process environment. An inlet 15 and an outlet 16 are provided for the process sample stream.

Figure 3:
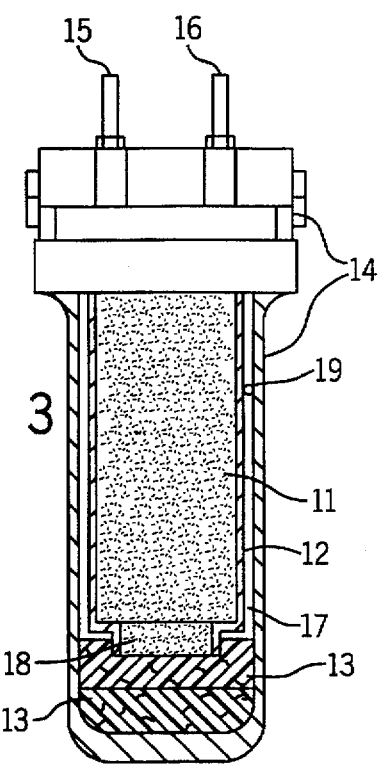
FIG. 3 is a cross sectional view taken along line X2—X2 of FIG. 2.

FIG. 3 is a cross-sectional view taken on line X2—X2 of FIG. 2. A container 12 creates a plenum 17 between the container 12 and the housing 14. The plenum 17 allows for fluid flow from the inlet 15 to the outlet 16. The container 12 may be plastic or any other material compatible with the process environment. The container 12 holds matrix 11.

The plenum 17 can receive a sensor 19 which is part of an analyzer (not shown) capable of measuring a chemical specie in the process stream. The sensor 19 should be disposed such that it can be in fluid communication with the pH adjusted process stream. Generally, this would mean that the sensor 19 must be placed nearer to the outlet 16 than to the inlet 15.

Still referring to FIG. 3, the container 12 has an opening 18 which is in communication with the plenum 17. The opening 18 is compressibly engaged with a porous material 13 disposed in the plenum. The porous material 13 may be a sponge. The sponge may be made of natural or man-made sponge, foam, or other porous material that does not degrade or dissolve in water. The porous material can be made of ceramics, derivatives of Teflon, or other polymers, but the material must be porous. The porosity can be adjusted to increase or decrease the rate of erosion. This has the effect of either increasing the rate of consumption of the pH adjusting chemical, thereby lowering the pH drastically, or decreasing the rate of consumption of the pH adjusting chemical, thereby lowering the pH slightly.

The opening 18 (of container 12 holding the matrix 11) can be varied (to thus affect the erosion rate) depending on the desired pH effect on the process stream.

The container 12 holds a matrix 11 of pH adjusting chemical and erosion rate modifier. The term "matrix" refers to a pH adjusting chemical embedded in an erosion rate modifier.

The pH adjusting chemical is preferably citric acid but may also be free acid forms of alkyl carbonates with 2–22 carbon atoms such as stearic acid, fumaric acid, tartaric acid, L-aspartic acid, oxalic acid, and the like; free acid forms of alkyl sulfonates with 8–22 carbon atoms; hexametaphosphoric acid and/or free acid forms of alkyl phophonates with 8–22 carbon atoms.

The erosion rate modifier is preferably polyethylene glycol (PEG) but may also be polyethylene oxide and/or polypropylene oxide polymers; hydroxyalkyl cellulose such as hydroxyethyl cellulose, hydroxypropyl cellulose, and the like; guar gum, gum arabic, and the like; polyvinyl pyrrolidone, polyethylene distearate, polyacrylic acid resins, or mixtures thereof.

The matrix of polyethylene glycol and citric acid is made as follows (this method may also be used for other pH adjusting chemicals and erosion rate modifiers). The PEG is melted in a beaker, by means of a water bath. The citric acid is added to the liquid PEG and mixed together thoroughly. The mixture is then poured into a container, where it solidifies as it cools.

The most preferred composition percentage is 50/50, by weight. The preferred composition percentage range is 30/70 to 70/30, by weight. The specific gravity is approximately 1.12. The weight percentage of pH adjusting chemical in the matrix can be varied depending on the desired pH effect.

The PEG should be solid at room temperature. Therefore, a preferred molecular weight for the PEG is about 700 or greater; more preferred is a molecular weight of about 2,000 or greater; a most preferred molecular weight is about 8,000.

Figure 4:
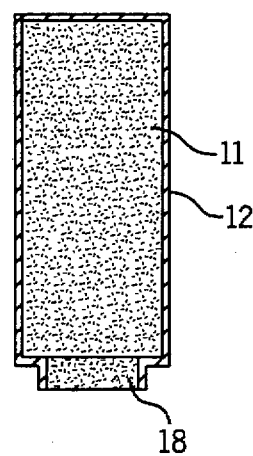
FIG. 4 is an elevational view of one example of a container having therein a matrix of pH adjusting chemical and erosion rate modifier.

FIG. 4 shows an elevational view of the container 12 having an opening 18 and the matrix 11 disposed therein.

Although the present invention has been described with reference to certain preferred embodiments, other variants are possible. For example, the pH adjusting system may be used in other analytical environments such as determining total residual chlorine. Total residual chlorine consists of free residual chlorine (hypochlorous acid and hypochlorite ion concentrations) and of combined residual chlorine (chloramine concentration). Chloramines have the general formula: $NH_{(3-x)}Cl_x$. Chloramines are formed by the reaction of ammonia and hypochlorous acid:

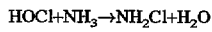

$$HOCl + NH_3 \rightarrow NH_2Cl + H_2O$$

Chloramine concentration is determined indirectly. The process pH is adjusted to 4-5 and potassium iodide is added. The iodide is converted to iodine, which is then measured. Therefore, the scope of the claims is not limited to the specific examples of the preferred versions herein. Rather, the claims should be looked to in order to judge the full scope of the invention.

I claim:

1. An apparatus for adjusting the pH of an electrolytically dissociated process stream comprising:

a housing having an inlet and an outlet for the process stream; and a surface erodible matrix disposed in the housing such that the matrix forms a plenum between itself and the housing, wherein the plenum allows for flow of the process stream between the inlet and the outlet of the housing, and wherein the matrix comprises a pH adjusting chemical and an erosion rate modifier.

2. The apparatus of claim 1, wherein the pH adjusting chemical is citric acid.

3. The apparatus of claim 2, wherein the erosion rate modifier is polyethylene glycol.

4. The apparatus of claim 3, wherein the polyethylene glycol has a molecular weight of about 8,000.

5. The apparatus of claim 4, further comprising a porous material disposed in the plenum, wherein the porous material surrounds the matrix and further modifies the erosion rate of the citric acid in the presence of the process stream.

6. The apparatus of claim 5, wherein the porous material is a sponge.

7. The apparatus of claim 6, further comprising an analyzer having a sensor which measures a chemical specie in the presence of the electrolytically dissociated process stream, wherein at least the sensor is disposed in the plenum such that the sensor is in fluid communication with the pH adjusted process stream.

8. The apparatus of claim 6, further comprising an analyzer having a sensor which measures a chemical specie in the presence of the electrolytically dissociated process stream, wherein the sensor is disposed outside the housing such that the sensor is in fluid communication with the process stream leaving the outlet of the housing.

9. The apparatus of claim 1, further comprising an analyzer having a sensor which measures a chemical specie in the presence of the electrolytically dissociated process stream, wherein at least the sensor is disposed in the plenum such that the sensor is in fluid communication with the pH adjusted process stream.

10. The apparatus of claim 1, further comprising an analyzer having a sensor which measures a chemical specie in the presence of the electrolytically dissociated process stream, wherein the sensor is disposed outside the housing such that the sensor is in fluid communication with the process stream leaving the outlet of the housing.

11. A method of adjusting the pH of an electrolytically dissociated process stream comprising feeding the process stream to the apparatus of claim 1.

12. An apparatus for adjusting the pH of an electrolytically dissociated process stream comprising:

a housing having an inlet and an outlet for the process stream;

a container having an opening, the container being disposed in the housing such that the container forms a plenum between itself and the housing, wherein the plenum allows for flow of the process stream between the inlet and the outlet of the housing and wherein the opening of the container is in communication with the plenum; and a surface erodible matrix disposed in the container, wherein the matrix comprises a pH adjusting chemical and an erosion rate modifier.

13. The apparatus of claim 12, further comprising a porous material disposed in the plenum and compressibly engaged with the opening of the container, wherein the porous material further modifies the erosion rate of the pH adjusting chemical in the presence of the process stream.

14. The apparatus of claim 13, wherein the porous material is a sponge.

15. The apparatus of claim 12, wherein the pH adjusting chemical is citric acid.

16. The apparatus of claim 15, wherein the erosion rate modifier is polyethylene glycol.

17. The apparatus of claim 16, wherein the polyethylene glycol has a molecular weight of about 8,000.

18. The apparatus of claim 17 further comprising, an analyzer having a sensor which measures a chemical specie in the presence of the electrolytically dissociated process stream, wherein at least the sensor is disposed in the plenum such that the sensor is in fluid communication with the pH adjusted process stream.

19. The apparatus of claim 17, further comprising an analyzer having a sensor which measures a chemical specie in the presence of the electrolytically dissociated process stream, wherein the sensor is disposed outside the housing such that the sensor is in fluid communication with the process stream leaving the outlet of the housing.

20. The apparatus of claim 12 further comprising, an analyzer having a sensor which measures a chemical specie in the presence of the electrolytically dissociated process stream, wherein at least the sensor is disposed in the plenum such that the sensor is in fluid communication with the pH adjusted process stream.

21. The apparatus of claim 12, further comprising an analyzer having a sensor which measures a chemical specie in the presence of the electrolytically dissociated process stream, wherein the sensor is disposed outside the housing such that the sensor is in fluid communication with the process stream leaving the outlet of the housing.

22. A method of adjusting the pH of an electrolytically dissociated process stream comprising feeding the process stream to the apparatus of claim 12.

23. An apparatus for adjusting the pH of an electrolytically dissociated process stream and measuring a chemical specie in the process stream comprising:

a housing having an inlet and an outlet for the process stream;

a surface erodible matrix disposed in the housing such that the matrix forms a plenum between itself and the housing, wherein the plenum allows for flow of the process stream between the inlet and the outlet of the housing, and wherein the matrix comprises a pH adjusting chemical and an erosion rate modifier; and an analyzer having a sensor which measures a chemical specie in the presence of the electrolytically dissociated process stream, wherein at least the sensor is disposed in the plenum such that the sensor is in fluid communication with the pH adjusted process stream.

* * * * *